Nov. 26, 1935.  M. C. STEUBER  2,022,058

POWER TRANSLATING DEVICE

Filed April 5, 1933    2 Sheets-Sheet 1

INVENTOR.
MILTON C. STEUBER.
BY
ATTORNEY.

Patented Nov. 26, 1935

2,022,058

UNITED STATES PATENT OFFICE 2,022,058

POWER TRANSLATING DEVICE

Milton C. Steuber, Madison, Wis.

Application April 5, 1933, Serial No. 664,567

13 Claims. (Cl. 74—260)

My invention relates to power translating mechanism and particularly to a device for translating power from a rotating power or drive shaft to a rotatable driven shaft.

An object of my invention is to provide a power translating device that shall transmit power torque from a drive shaft to a driven shaft through a system of gears so arranged as to give a full range of variation of speed and torque between limits established by the design of the several gears or parts.

A further object of my invention is to provide a power translating device having the above noted characteristics that shall give a free flow of power from the drive shaft to the driven shaft and that shall automatically operate to vary the speed of the driven shaft with respect to that of the power or drive shaft commensurate with the load on the driven shaft.

A further object of my invention is to provide a power translating device that shall be particularly applicable to automotive vehicles, and that shall obviate the necessity for manually shifting gears to compensate for load variations on the driving axles and that shall be of balanced and simple construction.

A further object of the invention is to provide a power translating device that is free wheeling within certain ranges of speed and which may rotate a drive shaft in either direction of rotation at speeds commensurate with the load.

These and other objects of my invention that shall hereinafter appear are attained by means of the power translating device hereinafter described and illustrated in the accompanying drawings, wherein:—

Figures 1, 2, 3:
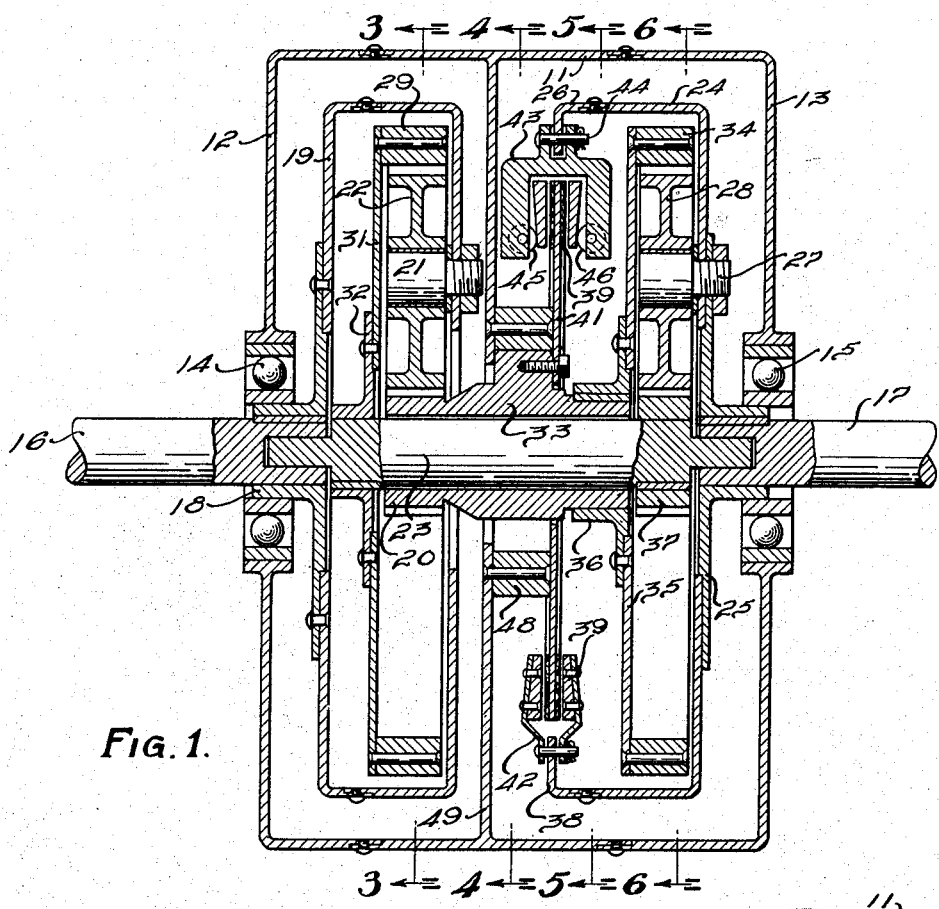
Figure 1 is a longitudinal section through a power translating device embodying features of my invention.
Fig. 2 is an end view of the device shown in Fig. 1.
Fig. 3 is a transverse section through the device taken on the line 3—3 of Fig. 1.

Referring to the drawings the power translating device comprises a cylindrical housing 11 having ends walls 12 and 13 provided with bearings 14 and 15, respectively, in which the power or drive shaft 16 and the driven shaft 17 are respectively journaled.

The inner end of the drive shaft 16 is keyed within the hub 18 of a driving plate or spider 19 which carries three equally spaced stub shafts 21 which are securely fixed thereto and upon which three driving planetary gears 22 are mounted for rotation.

A floating shaft 23, having one end journaled in the drive shaft 16 for relative rotary movement with respect thereto, is aligned with the drive shaft 16 and is journaled at its other end in driven shaft 17.

A driven spider or plate 24 is fixed to the hub 25, in which the inner end of the driven shaft 17 is splined, and is provided with a re-entrant annular flange 26 and which carries three stub shafts 27 that are preferably fixed thereto in equally spaced relation and equidistant from the center, a distance equal to that of the stub shafts 21 on the drive plate 19. Three driven planetary gears 28 are journaled for rotation upon the stub shafts 27.

A ring gear 29, which constitutes a differential element of a differential gear unit surrounds the driving gears 22 and is meshed therewith and is carried upon a disc 31 that is fixed to a hub 32 keyed upon the floating shaft 23. A pinion 20 which constitutes another differential element of the said differential gear unit is fixed to a floating hub or sleeve 33 rotatably mounted on the floating shaft 23 and is meshed with the driven planetary gears 22.

A ring gear or differential element 34 surrounds the driven gears 28 and is meshed therewith, and is carried upon a disc 35 that is fixed to a hub 36 keyed upon the floating hub 33, and a pinion or differential element 37 is keyed upon the floating shaft 23 and is meshed with the driven planetary gears 28.

By reason of the above described gear train, the driving gears 22 are caused to revolve about the axis of the power or drive shaft 16 when the latter is rotated. Such movement imparts rotary movement to the internal gear 29 and the pinion 20, the degree of movement of each being dependent upon the relative loads thereon. Rotation of the internal gear 29 imparts rotary movement to the pinion 20 and the floating hub 33 and rotary movement of the pinion 20 imparts rotary movement to the internal gear 34 that is connected to the hub 33.

Rotary movement of the internal gear 34 imparted by the floating hub 33 and the pinion 37 imparted by the floating shaft 23, imparts a revolving movement to the driven planetary gears 28 about the axis of the driven shaft 17 and turns the latter at a speed dependent upon the relative speeds of rotation of the pinion 37 and the internal gear 34.

Figure 6:
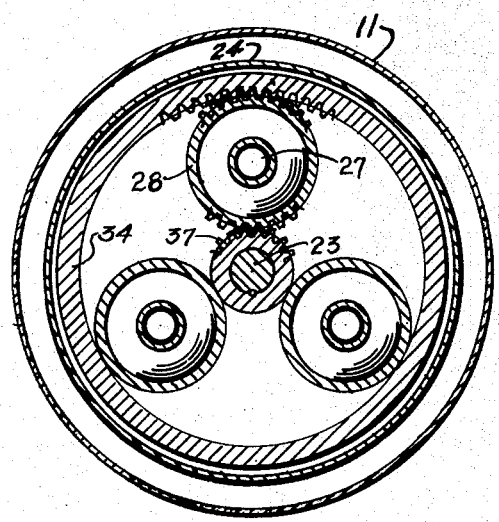
Fig. 6 is a transverse section through the device taken on the line 6—6 of Fig. 1.

From the foregoing, it is apparent that the driving gears 22 and their related internal gear 29 and pinion 20, Fig. 3, constitute a differential gear unit that is interrelated and interconnected to a similar differential gear unit comprising the driven gears 28 and the related internal gear 34 and pinion 37, Fig. 6.

Figure 5:
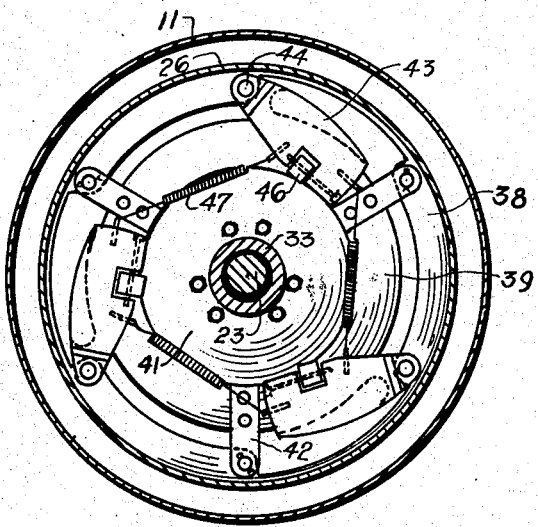
Fig. 5 is a transverse section through the device taken on the line 5—5 of Fig. 1.

Referring to Figs. 1 and 5, the inwardly directed flange portion 38 of the reentrant flange 26 of the spider 24 carries two annular relatively movable clutch rings 39 having their inner adjacent faces flat and adapted to engage the opposite flat faces of a clutch disc 41 that is fixed to the floating hub 33, and their outer faces inclined outwardly for a purpose that will hereinafter appear. The annular clutch rings 39 are connected to the flange portion 38 by means of flexible spring metal straps 42, which support the rings in concentric relation to the flange portion 38 as indicated in Fig. 5, the straps serving to normally support the rings out of contact with the clutch disc 41, but which permit movement of the rings into frictional engagement with the disc.

The flange portion 38 of the spider 24 also carries three weighted yokes 43 that are pivotally connected to the flange portion 38 by pins 44, the yokes having legs 45 which straddle the clutch rings 39 and are provided with rollers 46 for engaging the inclined outer surfaces of the clutch rings 39. Springs 47 are connected to the yokes in the manner shown in Fig. 5 and normally yieldingly retain the yokes in inner retracted position. When the speed of rotation of the spider 24 and the driven shaft 17 connected thereto, exceeds a predetermined speed determined by the tension of the springs 47, centrifugal force moves the yokes 43 outwardly, thereby causing the rollers 46 to press the clutch rings inwardly against the clutch disc 41 as they roll over the inclined surfaces of the rings 39.

Figure 4:
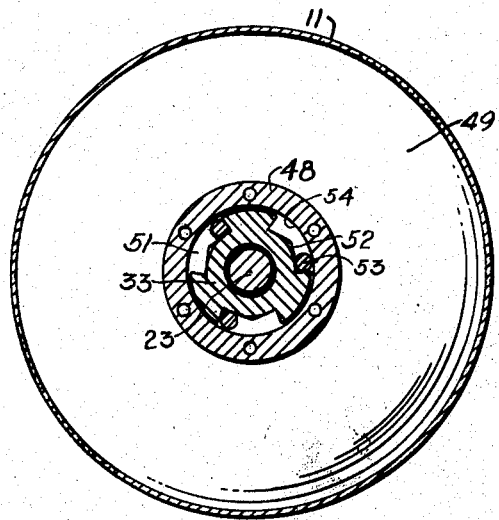
Fig. 4 is a transverse section through the device taken on the line 4—4 of Fig. 1.

For a purpose that will hereinafter appear, the floating hub 33 may rotate only in a counter-clockwise direction, Fig. 4, rotation in a clockwise direction being prevented by the roller ratchet device comprising a fixed ring 48 secured to a wall 49 of the casing 11, and in which the floating hub 33 is rotatably mounted. The floating hub 33 is provided with three longitudinally extending notches 51 having inclined inner surfaces 52 for engaging the surfaces of rollers 53. Any tendency of the hub to rotate in a clockwise direction is opposed in the well known manner by the rollers which wedge between the inclined surfaces of the notches and the inner cylindrical surface 54 of the ring 48.

The operation of the transmission mechanism above described is as follows. Assuming a load to be imposed on the driven shaft 17, and that power is applied to the driving shaft 16, rotating it in a counter-clockwise direction, Fig. 3, the spider 19 is rotated in a counter-clockwise direction, carrying with it the stub shafts 21. The planetary gears 22 revolve bodily about the axis of rotation of the driving shaft 16 and carry with it the ring gear 29 and pinion 20 at speeds proportionate to the resistance offered by the gear and pinion and the ratio of leverage due to their diametral differences.

Since the internal gear 29 is positively connected to pinion 37, and the pinion 20 is connected directly to the internal gear 34, the said gear and pinion rotate in a counter-clockwise direction when their respective pinion 20 and gear 29 rotate in that direction. However, the resistance to rotation of the driven shaft 17 caused by the load on said shaft, causes the pinion 37 to tend to rotate the planetary gears 28 in a clockwise direction, Fig. 6, and tends to rotate the internal gear 34 in a clockwise direction. As previously stated, the gear 34 and the floating hub 33 to which it is attached cannot rotate in that direction because of the roller ratchet device and consequently rotation of the pinion 37 causes the planetary gears 28 to rotate in a clockwise direction and roll over the teeth of the relatively fixed internal gear 34 and force the stub shafts 27 to revolve about the axis of the drive shaft 17 and turn the spider 24 and clutch rings 39 in a counter-clockwise direction, Fig. 5, at a speed proportional to the gear ratio between the driving shaft 16 and the driven shaft 17, which ratio may be that found to be the most desirable for the particular application of the transmission apparatus.

When the driven shaft 17 and the clutch rings 39 attain a predetermined speed of rotation, centrifugal force will cause the clutch rings to move gradually into engagement with the clutch disc 41 with gradually increasing gripping force, and cause the hub 33 to rotate in a counterclockwise direction, slowly at first and then faster as the friction of the clutch increases, thereby further increasing the speed of rotation of the driven shaft, and finally, when relative movement of the clutch rings and clutch disc ceases, the driven shaft 17 is directly connected to the driving shaft due to the locking of the gear train occasioned by the arrest of relative movement between the hub 33 and the spider 24 and driven shaft 17. The driven shaft 17 is then driven at the same speed as the driving shaft 16.

When the speed of rotation is reduced below a predetermined speed, the clutch rings will automatically be released by the action of the springs 47, and the load will be disconnected from the driving shaft. The load may be picked up and accelerated repeatedly in the manner described.

This transmission apparatus is particularly well adapted for use in driving automobiles, and it will be apparent that the transmission is inherently free wheeling below the speeds at which the clutch rings frictionally engage the clutch disc. So long as the clutch members are engaged the driven shaft 17 may drive the driving shaft 16, as when the accelerator of the automobile engine is closed and the automobile is rolling at a speed sufficient to maintain the clutch members engaged. At such speeds, the car may drive the engine when the power is cut off and the engine may serve as a brake. When the car speed falls below a predetermined speed and with the power cut off, the clutch releases and the transmission is then free wheeling.

From the foregoing it is apparent that the drive shaft of the automobile or machine may be driven at speeds commensurate with the load without imposing undue strain on the engine or transmission parts and that the transmission is free wheeling within certain ranges of speed, and is a balanced unit which provides a fly wheel effect.

While I have disclosed but one embodiment of the invention, it is obvious that omissions, additions and other changes may be made in the apparatus disclosed without departing from the spirit of the invention.

Having now described my invention, what I claim as new and desire to secure by Letters Patent, is:

1. In a power translating device, the combination with two interconnected differential gear units, each comprising a pair of differential elements, and a cooperating member, the said cooperating member of one unit being connected to the power and the said cooperating member of the other unit being connected to the load, a differential element of one unit being directly connected to an opposite but radially disposed differential element of the other unit.

2. In a power translating device, the combination with two differential gear units, each comprising a pair of differential gears of unequal ratio and a cooperating gear, the said cooperating gear of one unit being connected to the power and the said cooperating gear of the other unit being connected to the load, of positive driving connections between the differential gear of greater ratio of the one unit with the differential gear of lesser ratio of the other unit.

3. A power translating device, comprising a driving shaft, a driving member rotatable therewith, a driving gear carried by the driving member and having its axis eccentric to the drive shaft and bodily revolvable about the axis thereof, a pair of differential gears positively geared to the driving gear and rotatable about the axis of the driving shaft, a driven shaft, a driven member rotatable therewith, a driven gear carried by the driven member and having its axis eccentric to the driven shaft and bodily revolvable about the axis thereof for imparting rotary movement thereto, a pair of differential gears positively geared to the driven gear and rotatable about the axis of the driven shaft, the driving gear being positively connected to a differential gear associated with the driven gear and the driven gear being positively connected to a differential gear associated with the driving gear.

4. In a power translating device, the combination with a driving shaft, a driven shaft and two differential units including a member rotatable in one direction only for imparting movement from the driving shaft to the driven shaft, of a means driven by the driven shaft for frictionally engaging said member and driving it in the opposite direction for increasing the speed of rotation of the driven shaft and for locking the two shafts in direct drive relation.

5. In a power translating device, the combination with a driving shaft, a driven shaft and two differential units connecting said driving shaft to said driven shaft whereby the driven shaft is rotated by the driving shaft at a predetermined ratio of speed with respect to the driving shaft, of means operated by the driven shaft for locking said units together.

6. In a power translating device, the combination with a driving shaft, a driven shaft and two differential units connecting said driving shaft to said driven shaft, of a centrifugal clutch means actuated by the driven shaft for locking said units together.

7. In a power translating device, the combination with a driving shaft and a driven shaft, two differential units each comprising a pair of differential gears of unequal ratio and a cooperating gear secured to the driving and driven shafts, respectively, a gear of larger ratio in one unit being rigidly connected to a gear of smaller ratio in the other unit.

8. In a power translating device, the combination with a driving shaft and a driven shaft, two differential units each comprising a pair of differential gears of unequal ratio and a cooperating gear secured to the driving and driven shafts respectively, the gear of larger ratio in each unit being rigidly connected to the gear of smaller ratio in the other unit.

9. In a power translating device, the combination with a driving shaft and a driven shaft, two differential units each comprising a pair of differential gears of unequal ratio and a cooperating gear secured to the driving and driven shafts respectively, the gear of larger ratio in each unit being rigidly connected to the gear of smaller ratio in the other unit, said interconnected sets of gears being rotatable relative to each other, and means for preventing their relative rotation in one direction.

10. In a power translating device, the combination with a driving shaft and a driven shaft, two differential units each comprising a pair of differential gears of unequal ratio and a cooperating gear secured to the driving and driven shafts respectively, the gear of larger ratio in each unit being rigidly connected to the gear of smaller ratio in the other unit, said interconnected sets of gears being rotatable relative to each other, means for preventing their relative rotation in one direction, and means operated directly by the driven shaft for locking said differential units to cause a direct drive of said shafts.

11. In a power translating device, the combination with a driving shaft and a driven shaft, two differential units each comprising a pair of differential gears of unequal ratio and a cooperating gear secured to the driving and driven shafts respectively, the gear of larger ratio in each unit being rigidly connected to the gear of smaller ratio in the other unit, and means operated directly by the driven shaft for frictionally interlocking said gear units for causing changes in operating speed of the driven shaft.

12. In a power translating device, the combination with a driving shaft and a driven shaft, two differential units interconnecting said shafts, means for rigidly connecting a gear in each of said units to a gear in the other unit, and means for preventing said interconnected gears from rotating in one direction.

13. A power translating device consisting of a casing, a driving shaft journaled at one end of said casing, a differential gear journaled on a shaft parallel to and offset from the driving shaft, said shaft being fixed to the driving shaft to turn bodily therewith, an internal tooth gear ring in mesh with the outer edge of said differential gear, an external gear meshing with the inner edge of said differential gear, both of said internal and external gears being concentric with the driving shaft, a third shaft fixed concentrically to the internal gear ring and aligned with the driving shaft, an external tooth gear fixed to the opposite end of said third shaft, a sleeve journaled on said third shaft, said sleeve having fixed at its forward end the aforementioned external tooth gear, means cooperating with the casing for restraining motion of the sleeve unit in an opposite direction of rotation to that of the driving shaft, a second internal tooth gear fixed concentrically to the aforementioned sleeve, a clutch plate fixed concentrically to said sleeve, a driven shaft journaled in the opposite end of the casing from the driving shaft and aligned therewith, a fifth shaft, a second gear journaled on said fifth shaft parallel to and offset from the driven shaft but fixed thereto to turn bodily therewith, said second differential gear being meshed on its outer edge with the second internal tooth gear and its inner edge being meshed with the second mentioned external tooth pinion, means fixed to the driven shaft for engaging the aforementioned clutch plate, including a weighted yoke pivoted on one end to a carrying frame fixed to the driven shaft, and carrying pivoted means oppositely disposed on the yoke and engaging a pair of outwardly beveled clutch ring plates which engage the clutch as the yoke is moved outwardly by increased centrifugal speed.

MILTON C. STEUBER.